United States Patent
Choi et al.

(10) Patent No.: US 10,382,558 B2
(45) Date of Patent: Aug. 13, 2019

(54) EDGE RESOURCE SHARING

(71) Applicants: Nakjung Choi, Florham Park, NJ (US); Daewoo Kim, Pohang (KR)

(72) Inventors: Nakjung Choi, Florham Park, NJ (US); Daewoo Kim, Pohang (KR)

(73) Assignee: Nokia of America Corporation, Murray Hill, NJ (US)

(*) Notice: Subject to any disclaimer, the term of this patent is extended or adjusted under 35 U.S.C. 154(b) by 114 days.

(21) Appl. No.: 15/354,926

(22) Filed: Nov. 17, 2016

(65) Prior Publication Data
US 2018/0139726 A1 May 17, 2018

(51) Int. Cl.
*H04L 29/08* (2006.01)
*G06F 9/50* (2006.01)
*H04L 12/911* (2013.01)

(52) U.S. Cl.
CPC .............. *H04L 67/12* (2013.01); *G06F 9/50* (2013.01); *G06F 9/5005* (2013.01); *H04L 47/822* (2013.01); *H04L 67/1082* (2013.01); *H04L 67/125* (2013.01); *H04L 67/2809* (2013.01)

(58) Field of Classification Search
CPC .... H04W 72/04; H04L 67/12; H04L 67/1082; H04L 67/2809; H04L 47/822; H04L 67/125; G06F 9/5005; G06F 9/50
See application file for complete search history.

(56) References Cited

U.S. PATENT DOCUMENTS

2012/0014332 A1* 1/2012 Smith ................... H04W 16/14 370/329
2012/0042256 A1* 2/2012 Jamjoom .............. G06F 9/5011 715/736

(Continued)

FOREIGN PATENT DOCUMENTS

EP 2 472 783 A1 7/2012
WO WO 2015/136400 A1 9/2015

OTHER PUBLICATIONS

Choi, et al., "Fog Operating System for User-Oriented IoT Services: Challenges and Research Directions," IEEE Communications Magazine, vol. 55, Issue 8, Aug. 9, 2017, 8 pages.

(Continued)

*Primary Examiner* — Michael Won
(74) *Attorney, Agent, or Firm* — Tong, Rea, Bentley & Kim, LLC

(57) ABSTRACT

The present disclosure generally discloses improvements in computer performance in service providing architectures, including deployment of services in service providing architectures using edge resource sharing. The improvements to computer performance in deployment of services in service providing architectures using edge resource sharing may be based on edge resource sharing capabilities which may be configured to support deployment of services in service providing architectures using edge resource sharing. The edge resource sharing capabilities may be configured to enable an infrastructure provider device of an infrastructure provider to facilitate sharing of edge device resources of edge devices of an edge resource owner for supporting services of a service provider that offers services to customers.

19 Claims, 6 Drawing Sheets

(56) References Cited

U.S. PATENT DOCUMENTS

| | | | | |
|---|---|---|---|---|
| 2013/0041997 | A1* | 2/2013 | Li | H04W 4/70 |
| | | | | 709/223 |
| 2014/0229621 | A1 | 8/2014 | Song | |
| 2014/0355429 | A1* | 12/2014 | Smith | H04W 28/0226 |
| | | | | 370/230 |
| 2016/0295566 | A1* | 10/2016 | Morper | H04W 72/04 |
| 2016/0337175 | A1* | 11/2016 | Rao | H04L 49/25 |
| 2017/0310747 | A1* | 10/2017 | Cohn | H04L 67/1068 |
| 2017/0359233 | A1* | 12/2017 | Chen | H04L 41/5077 |
| 2018/0007131 | A1* | 1/2018 | Cohn | H04L 67/1068 |

OTHER PUBLICATIONS

Iosifidis, et al., "Enabling Crowd-Sourced Mobile Internet Access," IEEE INFOCOM 2014, IEEE Conference on Computer Communications, Toronto, Canada, Apr. 27-May 2, 2014, 9 pages.

FON, "FON is the Global WiFi Network Providing WiFi Access Through Hotspots," downloaded from https://network.fon.com/ on Oct. 31, 2017, 4 pages.

International Search Report and Written Opinion of corresponding Application PCT/US2017/060085, dated Jun. 25, 2018.

\* cited by examiner

EDGE RESOURCE SHARING

TECHNICAL FIELD

The present disclosure relates generally to communication networks and, more particularly but not exclusively, to improvements in computer performance for edge resource sharing in service providing architectures.

BACKGROUND

As the Internet-of-Things (IoT) continues to proliferate, tremendous numbers of edge devices are being deployed and connected to the Internet. For example, such edge devices may include IoT devices (e.g., sensors, actuators, or the like), devices supporting communications of IoT devices (e.g., smartphones, IoT gateways, or the like), and so forth. These various edge devices have diverse sets of resources, such as device resources (e.g., sensors, actuators, or the like), compute resources, memory resources, storage resources, network resources (e.g., network connectivity, network bandwidth, or the like), and so forth. These resources of the edge devices may provide a significant potential to support various types of services.

SUMMARY

The present disclosure generally discloses improvements in computer performance in service providing architectures, including improvements in computer performance in deploying services in service providing architectures using edge resource sharing.

In at least some embodiments, an apparatus for improving computer performance in deployment of services by service providers is provided. The apparatus includes a processor and a memory communicatively connected to the processor. The processor is configured to send, by a device of an infrastructure provider toward a device of an edge resource owner of an edge device, an indication of an incentive for the edge resource owner to share an edge device resource of the edge device. The processor is configured to receive, by the device of the infrastructure provider from the device of the edge resource owner, an indication that the edge device resource of the edge device is being offered for sharing by the edge resource owner. The processor is configured to send, by the device of the infrastructure provider toward a device of a service provider, an indication of a service price proposed by the infrastructure provider for providing services for the service provider using a set of edge device resources available to the infrastructure provider. The processor is configured to receive, by the device of the infrastructure provider from the device of the service provider, an indication that the service is to be provided using the set of edge device resources available to the infrastructure provider. The processor is configured to determine, based on the indication that the edge device resource of the edge device is being offered for sharing by the edge resource owner and based on the indication that the service is to be provided using the set of edge device resources available to the infrastructure provider, a deployment of the service using the set of edge device resources available to the infrastructure provider. In at least some embodiments, a computer-readable storage medium stores instructions which, when executed by a computer, cause the computer to perform a corresponding method for improving computer performance in deployment of services by service providers. In at least some embodiments, a corresponding method for improving computer performance in deployment of services by service providers is provided.

In at least some embodiments, an apparatus for improving computer performance in deployment of services by service providers is provided. The apparatus includes a processor and a memory communicatively connected to the processor. The processor is configured to receive, by a device of an edge resource owner of an edge device from a device of an infrastructure provider, an indication of an incentive for the edge resource owner to share an edge device resource of the edge device. The processor is configured to determine, by the device of the edge resource owner based on the indication of the incentive for the edge resource owner to share the edge device resource of the edge device, whether to share the edge device resource of the edge device. The processor is configured to send, by the device of the edge resource owner toward the device of the infrastructure provider, an indication as to whether the edge device resource of the edge device is being offered for sharing by the edge resource owner. In at least some embodiments, a computer-readable storage medium stores instructions which, when executed by a computer, cause the computer to perform a corresponding method for improving computer performance in deployment of services by service providers. In at least some embodiments, a corresponding method for improving computer performance in deployment of services by service providers is provided.

In at least some embodiments, an apparatus for improving computer performance in deployment of services by service providers is provided. The apparatus includes a processor and a memory communicatively connected to the processor. The processor is configured to receive, by a device of a service provider, a request of a customer for a service of the service provider. The processor is configured to receive, by the device of the service provider from a device of an infrastructure provider having infrastructure provider resources, an indication of a service price proposed by the infrastructure provider for providing services using edge device resources of a set of edge devices of an edge resource owner. The processor is configured to determine, by the device of the service provider based on the service price, that the service is to be provided using the edge device resources rather than using the infrastructure provider resources. The processor is configured to send, from the device of the service provider toward the device of the infrastructure provider, an indication that the service is to be provided using the edge device resources. In at least some embodiments, a computer-readable storage medium stores instructions which, when executed by a computer, cause the computer to perform a corresponding method for improving computer performance in deployment of services by service providers. In at least some embodiments, a corresponding method for improving computer performance in deployment of services by service providers is provided.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure generally discloses improvements in computer performance in service providing architectures, including deployment of services in service providing architectures using edge resource sharing. The improvements to computer performance in deployment of services in service providing architectures using edge resource sharing may be based on edge resource sharing capabilities which may be configured to support deployment of services in service providing architectures using edge resource sharing. The edge resource sharing capabilities may be configured to enable an infrastructure provider device of an infrastructure provider to facilitate sharing of edge device resources of edge devices of an edge resource owner for supporting services of a service provider that offers services to customers. The infrastructure provider may incentivize the edge resource owner to make edge device resources of edge devices of the edge resource owner available for use by the service provider. The infrastructure provider may offer to the service provider to deploy services of the service provider on edge device resources of edge devices of the edge resource owner rather than on infrastructure provider resources of the infrastructure provider. The infrastructure provider, edge resource owner, and service provider may interact in various ways to support deployment of various services of the service provider on edge device resources of edge devices of the edge resource owner under the control of the infrastructure provider. It will be appreciated that these and various other embodiments and potential advantages of edge resource sharing capabilities may be further understood by way of reference to the example architecture of FIG. 1.

Figure 1:
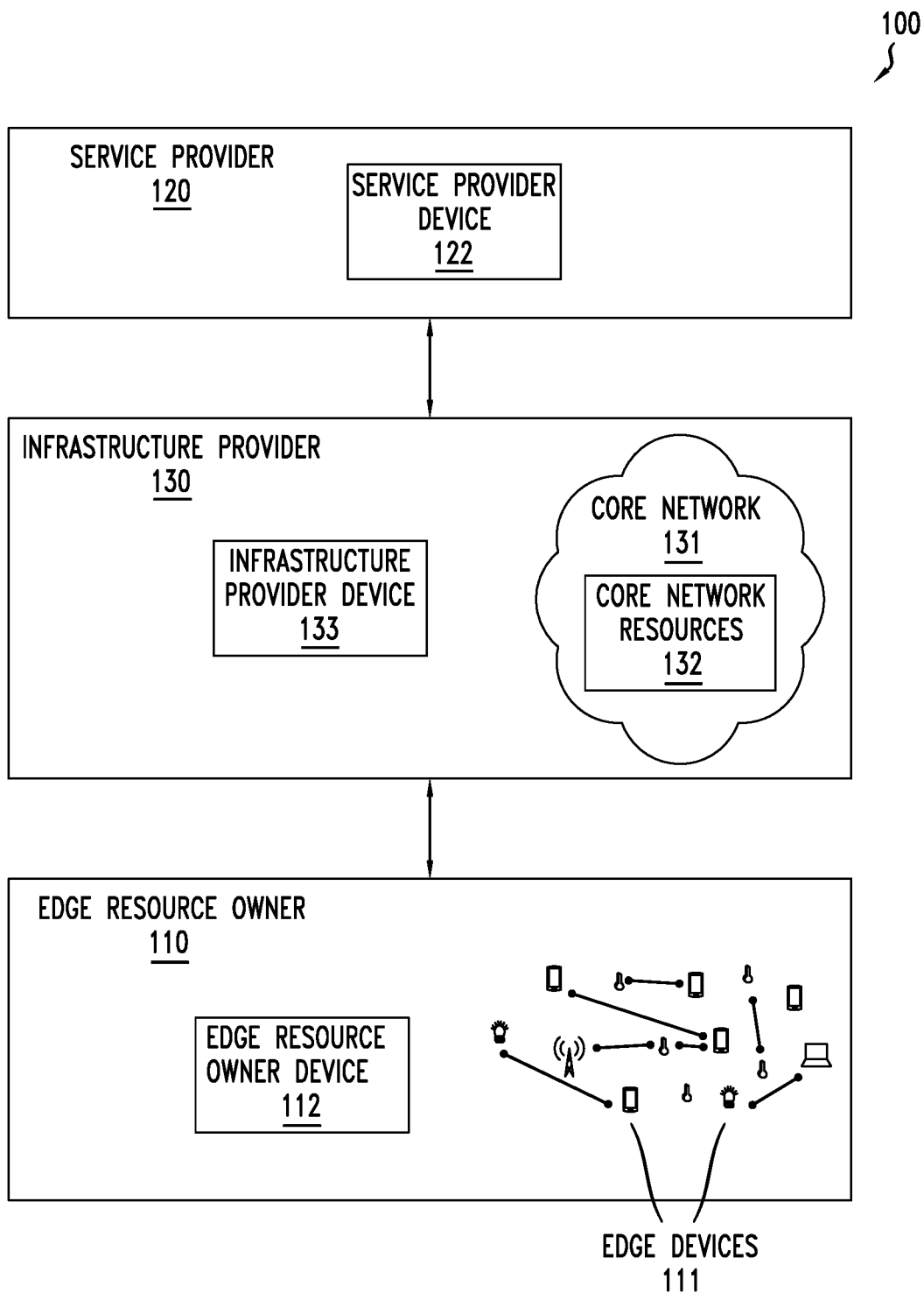
FIG. 1 depicts an example architecture configured to enable an infrastructure provider to use edge resource sharing by an edge resource owner to support services for service providers.

FIG. 1 depicts an example architecture configured to enable an infrastructure provider to use edge resource sharing by edge resource owners to support services for service providers.

The architecture 100 includes an edge resource owner (ER) 110, a service provider (SP) 120, and an infrastructure provider (InP) 130. It will be appreciated that, although primarily presented in FIG. 1 (for purposes of clarity) as including a single ERO 110, a single SP 120, and a single InP 130, the architecture 100 may include multiple EROs (e.g., each of which may interact with all or subsets of InPs), multiple SPs (each of which may interact with all or subsets of the InPs), multiple InPs (each of which may interact with all or subsets of EROs or all or subsets of SPs), or the like, as well as various combinations thereof. It will be appreciated that, although omitted from FIG. 1 (for purposes of clarity), the architecture 100 may include subscribers and associated subscriber devices via which the subscribers may request and use services from the SP(s).

The ERO 110 is an edge resource owner that owns edge device resources of a set of one or more edge devices (EDs) 111. The ERO 110 may be an individual (e.g., having one or more edge devices), a small company (e.g., having a set of edge devices, which may include edge devices of the company, edge devices of employees of the company, or the like), an enterprise having many edge devices (e.g., edge devices of the enterprise, edge devices of employees of the enterprise, or the like), a mobile network operator having a large-scale communication and resource infrastructure (e.g., IoT devices such as sensors and associated network infrastructure for supporting communications by the IoT devices), or the like.

The EDs 111 may include various types of edge devices. For example, the EDs 111 may include IoT devices (e.g., sensors, actuators, or the like), devices which may be used to support IoT devices, or the like. For example, devices which may be used to support IoT devices may include end user devices (e.g., smartphones, tablet computers, laptop computers, desktop computers, televisions, or the like), network access devices (e.g., cellular access points, WiFi access points, modems, or the like), edge communication devices (e.g., routers, modems, set-top boxes, or the like), or various other types of edge devices. The EDs 111 (or portions thereof) may or may not be networked together. The EDs 111 (or portions thereof) may be associated or networked together to provide an edge cloud arrangement, a fog cloud arrangement, or any other suitable arrangement of devices. The EDs 111 may include various other types of devices which may operate at or near the edge of communication networks.

The EDs 111 include various types of edge device resources. The edge device resources of an ED 111 may include device resources (e.g., sensors, actuators, or the like), compute resources, memory resources, storage resources, network resources (e.g., network connectivity, network bandwidth, or the like), or the like, as well as various combinations thereof. The network resources of the EDs 111 may include one or more network interfaces, which may include one or more network interfaces which may be configured to support local communications between EDs 111 (e.g., using WiFi, Bluetooth, or other relatively short-range communication capabilities), one or more network interfaces which may be configured to support wide-area communications by the EDs 111 with communication networks (e.g., using WiFi interfaces, low-power wide area network (LPWAN) interfaces (e.g., SigFox, Lora, or the like) cellular interfaces, or the like), or the like, as well as various combinations thereof. The edge device resources of EDs 111 may vary for different device types of the EDs 111 (e.g., sensor resources for a sensor, actuator resources for an actuator, processing and memory resources for a smartphone, storage and network resources for a wireless access point, or the like).

The edge devices resources of the EDs 111 may include edge device resources which may be shared by the ERO 110 (e.g., shared for use by the InP 130 if the InP 130 pays for use of those edge device resources). The ERO 110 may be offered, and receive, an incentive for sharing the edge devices resource of the EDs 111 (e.g., an incentive offered by the InP 130, such as where the InP 130 offers to pay for use of the edge device resources of the EDs 111). It is noted that there is also expected to be a cost associated with sharing of the edge devices resource of the EDs 111 (e.g., costs such as energy consumption or the like).

The ERO 110 is depicted as having an ERO device (EROD) 112 associated therewith. The EROD 112 represents the ability to support various functions for supporting edge resource sharing capabilities. The EROD 112 may be a standalone device that is configured to provide functions for supporting edge resource sharing capabilities related to sharing of edge resources of the EDs 111 (which is depicted in FIG. 1, for purposes of clarity), may be embedded within or supported by one or more of the EDs 111 such that the EDs 111 themselves provide functions for supporting edge resource sharing capabilities related to sharing of edge resources of the EDs 111 (which is omitted from FIG. 1, for purposes of clarity), or combinations thereof.

The EROD 112, as noted above, represents the ability to support various functions for supporting edge resource sharing capabilities. The EROD 112 may be configured to receive, from the InP 130, an incentive to share the edge device resources of the EDs 111. The EROD 112 may be configured to determine, based on the incentive to share the edge device resources of the EDs 111 (and, optionally, based on other information), whether or not to share edge device resources of EDs 111. The EROD 112 may be configured to determine, based on the incentive to share the edge device resources of the EDs 111 (and, optionally, based on other information), an amount of edge device resources to share (e.g., for each of the EDs 111, anywhere from none to all of the edge device resources of the ED 111). The EROD 112 may be configured to determine, based on the incentive to share the edge device resources of the EDs 111 (and, optionally, based on other information), edge resource sharing information (e.g., whether or not to share edge device resources, the amount(s) of edge device resources to share, or the like) in order to increase or maximize utility where the utility may be based on various measures (e.g., revenue or other measures of utility). The EROD 112 may be configured to send, to the InP 130, an indication edge resource sharing information determined by the EROD 112. The EROD 112 may be configured to provide various other functions for supporting the edge resource sharing capabilities.

The SP 120 is a service provider configured to provide services for subscribers. The SP 120 may offer services to subscribers and may provide services to subscribers based on service requests received from subscribers. The SP 120 may provide various types of services which may be supported using infrastructure resources of InP 130 and/or using edge device resources of EDs 111 of ERO 110. For example, the services provided by SP 120 may include traditional cloud-based services (e.g., cloud-based application hosting, cloud-based file systems, or the like), which may be particularly well-suited for centralized deployment within a cloud or across a set of clouds. For example, the services may include edge-based services (e.g., IoT-type services or other types of services), which may be particularly well-suited for edge-based deployment. These two service categories may have significantly different features, and even services within each of these two service categories may have significantly different features. This may be especially true for edge-based services (e.g., given the diverse types of IoT services and related services which may be provided). For example, for edge-based services (e.g., IoT services and other similar types of services which may rely on edge devices), various services may have the following features: (1) a wide range of service requirements (e.g., low latency versus delay-tolerant), (2) use of distributed multi-dimensional resources (e.g., compute, storage, network, actuator/sensor, and so forth), and (3) localization and dynamics. For example, services provided by SP 120 may include an application hosting service, an IoT data collection service, a surveillance service (e.g., for a home or business, a city-scale surveillance service, or the like), or the like.

The SP 120 may provide services to subscribers using resources that are made available to SP 120 by InP 130 (which, as discussed further below, may include resources owned by the InP 130 and/or edge device resources of EDs 111 that may be leased by InP 130 from ERO 110). It is noted that, in many instances, resources typically used to support traditional cloud-based services (e.g., wide-area cellular access and associated datacenters) may not be able to adequately meet certain requirements of emerging IoT services and related edge-based services. For example, a relative lack of flexibility of resources typically used to support traditional cloud-based services may make it difficult for such resources to support emerging IoT services and related edge-based services. It is further noted that, in contrast to resources typically used to support traditional cloud-based services, edge resources (e.g., edge devices, edge networks, or the like) typically can provide various functions (e.g., processing capability, connectivity, and so forth) with relatively low latency and cost. Additionally, it is noted that the amount of edge resources deployed is expected to continue to increase, due deployments of providers, businesses, individuals, and so forth. The SP 120, given the flexibility to run services using resources owned by the InP 130 and/or using edge device resources of EDs 111 that may be leased by InP 130 from ERO 110, may be able to increase profit by reducing costs associated with running services by intelligently selecting between running services using resources owned by the InP 130 or using edge device resources of EDs 111 that may be leased by InP 130 from ERO 110 (e.g., based on a comparison of a cost of running the service on resources owned by the InP 130 and a cost of running the service using edge device resources of EDs 111 that may be leased by InP 130 from ERO 110).

The SP 120 has a service provider device (SPD) 122 associated therewith. The SPD 122 may be configured to provide various functions for supporting edge resource sharing capabilities. The SPD 122 may be configured to receive, from the InP 130, a service price for providing the service using edge device resources of ERO 110 that are available to the InP 130. The service price also may be referred to herein as a resource price (e.g., a price for use of shared edge device resources to provide a service). The EROD 112 may be configured to determine, based on the service price (and, optionally, based on other information), whether to deploy the service on the portion of the infrastructure owned by the InP 130 (i.e., the core network 131 of the InP 130) or on infrastructure leased by the InP 130 from the ERO 110 (e.g., edge device resources of EDs 111). The SPD 122 may be configured to determine, based on the service price (and, optionally, based on other information), service deployment information (e.g., for a given service, whether the service is to be deployed on the core network 131 or using the edge device resources of the EDs 111) in order to increase or maximize utility where the utility may be based on various measures (e.g., profit or other measures of utility). The SPD 122 may be configured to send, to the InP 130, an indication as to whether a particular service is to be deployed on the core network 131 or is to be deployed using the edge device resources of the EDs 111. The SPD 122 may be configured to provide various other functions for supporting edge resource sharing capabilities. The SPD 122 may be a management system (e.g., a service management system, a service provisioning system or the like), a control device, or the like.

The InP 130 is an infrastructure provider that provides infrastructure configured to support services of service providers (illustratively, SP 130). The InP 130 owns a portion of the infrastructure and leases a portion of the infrastructure from edge resource owners (illustratively, ERO 110). The owned portion of the infrastructure may be considered to be the core portion of the infrastructure (which also may be referred to as a core network 131 having core network resources 132). The core network 131 may include one or more centralized datacenters or cloud networks, one or more distributed datacenters or clouds (which also may be referred to as edge datacenters or clouds), or the like, as well as various combinations thereof. The core network 131 also may include underlying communications infrastructure, such as where the InP 130 is a communications service provider. The core network 131 also may include various edge devices which may provide connectivity for the EDs 111 of the ERO 110 (e.g., wireline network access points, cellular access devices, WiFi access points, or the like, as well as various combinations thereof). The InP 130 may directly own the minimum number of edge devices to support minimum edge network connectivity for the EDs 111 of ERO 110 such that, without any resources from the EDs 111, the devices of the core network 131 of the InP 130 devices can connection with the EDs 111 of the ERO 110 (e.g., where, for a given service, a portion of the service is provided using edge device resources of EDs 111 of ERO 110 (e.g., device resources of the EDs) and a portion of the service is provided using core network resources 132 of core network 131 (e.g., compute and memory resources supporting the device resources of the ERO 110)). The core network resources 132 of core network 131 will be understood to include various types of resources configured to support services of service providers, such as compute resources, memory resources, storage resources, network resources, or the like, as well as various combinations thereof. It is noted that the core network resources 132 of the core network 131 of the InP 130 also may be referred to herein as infrastructure provider resources as these are resources owned by the infrastructure provider (as opposed to the edge device resources of the EDs 111 of the ERO 110 which are owned by the ERO 110). The leased portion of the infrastructure includes edge device resources of EDs 111 that are leased by the InP 130 from the ERO 110 (discussed in additional detail hereinabove). The leasing of the edge device resources of EDs 111 provides the InP 130 with flexibility in supporting various services for service providers. The InP 130, by utilizing edge device resources of EDs 111 (in addition to the resources owned by InP 130) to support services, can support more services and, thus, can increase its profit.

The InP 130 has an infrastructure provider device (IPD) 133 associated therewith. The IPD 133 may be configured to provide various functions for supporting edge resource sharing capabilities. The IPD 133 may be configured to (1) provide, to the ERO 110, an incentive to share the edge device resources of the EDs 111 and (2) receive, from the ERO 110 (e.g., determined by the ERO 110 based on the incentive), an indication of edge resource sharing information (e.g., whether or not the ERO 110 is offering to share edge device resources of EDs 111, the amount(s) of edge device resources the ERO 110 is offering to share, or the like). The IPD 133 may be configured to (1) provide, to the SP 120, a service price for providing the service using edge device resources of ERO 110 that are available to the InP 130 and (2) receive, from the SP 120 (e.g., determined by the SP 120 based on the service price for providing the service using edge device resources of ERO 110 that are available to the InP 130), an indication as to whether a particular service is to be deployed on the core network 131 of InP 130 or is to be deployed using the edge device resources of the EDs 111 of ERO 110. The IPD 133 may be configured to determine, based on the indication of edge resource sharing information and based on the an indication as to whether a particular service is to be deployed on the core network 131 or is to be deployed using the edge device resources of the EDs 111, deployment of the service using resources available to the InP 130. The IPD 133 may be configured to determine, based on an indication that the service is to be deployed using the edge device resources of the EDs 111, a deployment of the service on the edge device resources of the EDs 111. The IPD 133 may be configured to determine deployment of the service on the edge device resources of the EDs 111 in a manner for maximizing a profit of the InP 130 for supporting the service. The IPD 133 may be configured to determine deployment of the service on the edge device resources of the EDs 111 in a manner for maximizing the profit of the InP 130 for supporting the service by one or both of determining deployment of the service on the edge device resources of the EDs 111 in a manner for maximizing an income of the InP 130 for supporting the service or determining deployment of the service on the edge device resources of the EDs 111 in a manner for minimizing a cost to the InP 130 for supporting the service. The IPD 133 may be configured to provide various other functions for supporting edge resource sharing capabilities. The IPD 133 may be a management system (e.g., a service management system, a service provisioning system or the like), a control device, or the like.

The architecture 100, as discussed above, is configured to enable infrastructure providers (illustratively, InP 130) to use edge resource sharing by edge resource owners (illustratively, using EDs 111 of ED 110) to support services for service providers (illustratively, SP 120). The architecture 100 is configured to support interaction between the various devices of various entities so as to enable edge resource sharing by which the edge resource owners may generate revenue, the infrastructure provider may increase profit, and the service provider may increase profit while also providing improved quality-of-service to the service subscribers. The interaction between the various devices of various entities for edge resource sharing may be further understood by way of reference to FIGS. 2-5.

Figure 2:
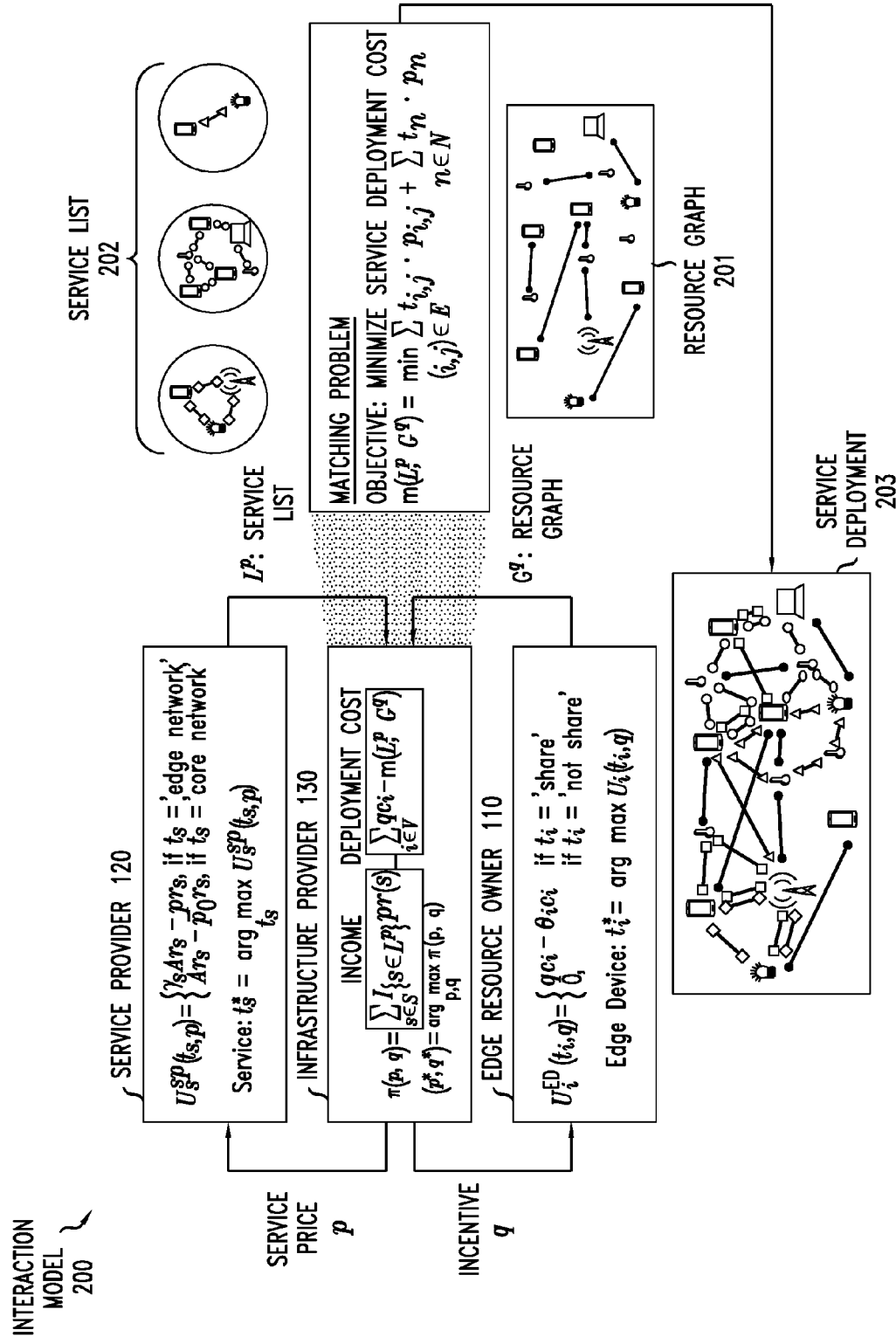
FIG. 2 depicts an interaction model illustrating interaction between the edge resource owner, the service provider, and the infrastructure provider of FIG. 1.

FIG. 2 depicts an interaction model illustrating interaction between the edge resource owner, the service provider, and the infrastructure provider of FIG. 1. As depicted in FIG. 2, the interaction model 200 illustrates interaction between ERO 110, SP 120, and InP 130. It will be appreciated that, although primarily presented within the context of interaction between the entities, the interaction may include automated interaction between devices of the entities (e.g., EDs 111 and/or ERODs 112 associated with ERO 110, SPD 122 of SP 120, and IPD 133 of InP 130).

The InP 130 provides the ERO 110 with an incentive for the ERO 110 to share edge device resources of one or more EDs 111. This incentive is denoted in the interaction model 200 as incentive q. The incentive q may be provided in a single message to an EROD 112 of the ERO 110 (which may or may not further propagate the incentive q to individual EDs 111 of the ERO 110), may be provided to EDs 111 of the ERO 110, or the like, as well as various combinations thereof. The incentive might be a monetary incentive (e.g., remuneration to be provided to the ERO 110 for sharing edge devices resources) or other type incentive. The incentive q may be specified in terms of the incentive to be provided per unit resource, the incentive to be provided per unit time, or the like, as well as various combinations thereof. The incentive q may be provided to an EROD 112 of the ERO 110 (which may or may not further propagate the incentive q to individual EDs 111 of the ERO 110), may be provided to EDs 111 of the ERO 110, or the like, as well as various combinations thereof. The incentive q may be provided in a single message (e.g., a broadcast message, a multicast message or the like), may be provided in multiple messages (e.g., unicast messages, multiple broadcast or multicast messages transporting different information associated with incentive q, or the like, as well as various combinations thereof), or the like. It will be appreciated that, although primarily presented within the context of embodiments in which a single incentive q is provided to the ERO 110, in at least some embodiments the InP 130 may provide multiple incentives (e.g., $\{q_1 \ldots, q_n\}$) to the ERO 110 (e.g., different incentives $q_i$ may be provided for different device types of the EDs 111 of ERO 110 for different types of edge device resources which could be shared by EDs 111 of ERO 110, or the like, as well as various combinations thereof). It will be appreciated that, although primarily presented within the context of embodiments in which a single incentive q is provided to a single ERO 110, in at least some embodiments the InP 130 may provide different incentives to different EROs (for purposes of clarity only a single ERO, ERO 110, is depicted in FIG. 1 and FIG. 2).

The ERO 110 determines, based on the incentive q, whether or not to share edge device resources of EDs 111 of the ERO 110. The ERO 110 may make the determination as to whether or not to share edge device resources of EDs 111 for the group of EDs 111 as a whole (e.g., which determination may be made by the EROD 112), on a per ED basis for EDs 111 (e.g., which determination may be made by the EROD 112 for each of the EDs 111, by individual EDs 111 for themselves, or the like), or the like, as well as various combinations thereof). The ERO 110 may determine whether or not to share edge device resources of EDs 111 of the ERO 110 based on (in addition to the incentive q) one or more of a quantity of edge device resources of EDs 111 that the ERO 110 is willing to share (which may be denoted as $c_i$), a willingness of the ERO 110 to share edge device resources of EDs 111 (which may be denoted as $\theta_i$), or the like, as well as various combinations thereof. The ERO 110 may make the determination as to whether or not to share edge device resources of a particular ED 111 (which may be denoted as $ED_i$) based on a utility function (which may be denoted as $U_i^{ED}$) configured to measure values of sharing the edge device resources of $ED_i$ and not sharing the edge device resources of $ED_i$, respectively, and determining whether sharing or not sharing the edge device resources of $ED_i$ maximizes the utility function. One example of use of such a utility function, that is based on the incentive q, a quantity $c_i$ of edge device resources of $ED_i$ that the ERO 110 is willing to share, and a willingness of the ERO 110 to share edge device resources of $ED_i$, follows:

$$U_i^{ED}(t_i, q) = \begin{cases} qc_i - \theta_i c_i & \text{if } t_i = \text{'share'} \\ 0 & \text{if } t_i = \text{'not share'} \end{cases}$$

$$t_i^* = \underset{t_i}{\operatorname{argmax}} U_i(t_i, q).$$

Here, $t_i^*$ is the $t_i$ that maximizes the utility for the ERO 110. The result of application of the utility function for the $ED_i$ is an indication as to whether or not the ERO 110 is willing to share edge device resources of $ED_i$. The result of the application of the utility function for the $ED_i$ also may include an indication of the quantity $c_i$ of edge device resources of $ED_i$ that the ERO 110 is willing to share, a length of time for which the ERO 110 is willing to share the edge device resources of the $ED_i$, or the like, as well as various combinations thereof. The ERO 110, by applying the utility function for each of the EDs 111, is able to determine, for each of the EDs 111, whether or not the ERO 110 is willing to share edge device resources of $ED_i$ (and, optionally, related information as discussed above). It is noted that the foregoing utility function is merely one type of utility function which may be used by ERO 110 to determine whether or not to share edge device resources of a particular ED 111 (e.g., the utility value associated with a decision to share edge device resources of the ERO 110 may be defined and calculated in other ways, the utility value associated with a decision not to share edge device resources of the ERO 110 may be defined and calculated in other ways, or the like, as well as various combinations thereof). It will be appreciated that, although primarily presented with respect to use of a single utility function to determine whether or not to share edge device resources of a particular ED 111, in at least some embodiments multiple utility functions may be used to determine whether or not to share edge device resources of a particular ED 111 (e.g., different utility functions may be used for different types of resources of the ED 111, such as for compute resources versus storage resources). It will be appreciated that, although primarily presented with respect to use of a single utility function to determine whether or not to share edge device resources of the EDs 111 of ERO 110, in at least some embodiments multiple utility functions may be used to determine whether or not to share edge device resources of the EDs 111 of ERO 110 (e.g., different utility functions may be used for different device types of EDs 111 of ERO 110, for different types of resources of EDs 111, or the like, as well as various combinations thereof).

The ERO 110 provides, to the InP 130, edge device resource sharing information determined by the ERO 110 based on the incentive q. The edge resource sharing information includes information indicative as to which EDs 111 of ERO 110 for which ERO 110 is willing to share edge device resources of the ED 111 (e.g., a list of EDs 111 for which the ERO 110 is willing to share associated edge device resources, indications for each of the EDs 111 of the ERO 110 as to whether or not the ERO 110 is willing to share edge device resources of the ED 111, or the like). The edge resource sharing information also may include, for each of the EDs 111 of ERO 110 for which the ERO 110 is willing to share edge device resources, one or more of an indication of the quantity $c_i$ of edge device resources of the ED 111 that the ERO 110 is willing to share, a length of time for which the ERO 110 is willing to share the edge device resources of the ED 111, or the like, as well as various combinations thereof. The edge resource sharing information may be provided to the InP 130 by the EROD 112 (e.g., for some or all of the EDs 111 of ERO 110, such as where the EROD 112 determines edge resource sharing information from the EDs, collects edge device resources sharing information from EDs 111 where the EDs 111 determine the edge device resource sharing information, of the like), by EDs 111 (e.g., such as where EDs 111 determine whether or not their edge device resources are going to be shared), or the like, as well as various combinations thereof. The edge resource sharing information may be provided to the InP 130 by the ERO 110 on a per edge device basis, as a set of edge resource sharing information for the set of EDs 111 as a whole, or the like. The edge resource sharing information for the set of EDs 111, whether provided as separate sets of edge resource sharing information on a per edge device basis or as a complete set of edge resource sharing information for the set of EDs 111, may represent a set of edge device resources that the ERO 110 is willing to share with the InP 130. This is reflected in the interaction model 200 as the resource graph $G^q$ (an example of which is depicted as resource graph 201). The resource graph $G^q$ is a network graph which may include information identifying the EDs 111 for which the ERO 110 is willing to share edge device resources, edge device resources of the EDs 111 that the ERO 110 is willing to share, connectivity between EDs 111 for which the ERO 110 is willing to share resources (e.g., based on indications of connectivity resources of the EDs 111 that the ERO 110 is willing to share), or the like, as well as various combinations thereof. The resource graph $G^q$ may represent an edge device resource network onto which the InP 130 may map services of the SP 120 for services of the SP 120 that are to be deployed by InP 130 using edge device resources of the EDs 111 rather than on the core network 131 of the InP 130. The resource graph $G^q$ may be determined by the ERO 110 and provided to the InP 130 (e.g., by EROD 112 based on sets of edge resource sharing information determined for the EDs 111 of ERO 110), may be determined by InP 130 based on the edge resource sharing information received from ERO 110, or the like, as well as various combinations thereof.

The InP 130 provides the SP 120 with a service price proposed by the InP 130 for providing services for the SP 120 using an edge device resources of ERO 110 that are available to InP 130. This service price is denoted in the interaction model 200 as service price p. The service price p may be provided to the SPD 122 of the SP 120 by the IPD 133 of the InP 130. It will be appreciated that, although primarily presented within the context of embodiments in which a single service price p is provided to SP 120, in at least some embodiments the InP 130 may provide multiple service prices (e.g., $\{p_1, \ldots, p_m\}$) to the SP 120 (e.g., different service prices $p_i$ may be provided for different service types of services offered by SP 120, for different services offered by SP 120, or the like, as well as various combinations thereof). It will be appreciated that, although primarily presented within the context of embodiments in which a single service price p is provided to a single SP 120, in at least some embodiments the InP 130 may provide different service prices to different SPs (for purposes of clarity only a single SP, SP 120, is depicted in FIG. 1 and FIG. 2).

The SP 120 determines, based on the service price p, whether or not to deploy services of the SP 120 using core network resources of InP 130 (e.g., core network 131 of InP 130) or using edge device resources available to InP 130 (e.g., edge device resources of EDs 111 offered for sharing by the ERO 110 to the InP 130). The SP 120 may make the determination, as to whether services of SP 120 are to be deployed using core network resources of InP 130 or using edge device resources available to InP 130, for groups of services of SP 120 (e.g., the services of SP 120 as a whole, subsets of the services of SP 120, or the like), on a per service basis, or the like, as well as various combinations thereof. The SP 120 may make the determination, as to whether services of SP 120 are to be deployed using core network resources of InP 130 or using edge device resources available to InP 130, based on (in addition to the service price p associated with using edge device resources available to InP 130) one or more of a service price for associated with using core network resources of InP 130 to deploy the service of the SP 120 (which may be denoted as $p_0$), a service-related parameter specified by SP 120 for the service (which may be denoted as γ, and which represent one or more of an importance of the service to the SP 120, a sensitivity of the SP 120 or the customer to the stability of the service, quality-of-service associated with the service of the SP 120, or the like, as well as various combinations thereof), or the like, as well as various combinations thereof. The SP 120 may make the determination, as to whether a particular service of SP 120 (which may be denoted using s) is to be deployed using core network resources of InP 130 or using edge device resources available to InP 130, based on a utility function (which may be denoted as $U_s^{SP}$) configured to measure values of deploying service s using edge device resources available to InP 130 and deploying service s using core network resources of InP 130, respectively, and determining whether deploying service s using edge device resources available to InP 130 or deploying service s using core network resources of InP 130 maximizes the utility function. One example of use of such a utility function, that is based on a quantity $r_s$ of resources requested or needed for service s (which may be a single value defining or representing the resources requested or needed for the service s, a vector of values corresponding to respective resource types requested or needed for the service s, or the like), the service price p for use of the edge device resources of the ERO 110 (proposed by the InP 130 to the SP 120), a service price $p_0$ associated with using core network resources of InP 130 to deploy the service of the SP 120, the service-related parameter γ specified by SP 120 for the service, and a normalization value A, follows:

$$U_s^{SP}(t_s, p) = \begin{cases} \gamma_s A r_s - p r_s & \text{if } t_s = \text{'edge network'} \\ A r_s - p_0 r_s & \text{if } t_s = \text{'core network'} \end{cases}$$

$$t_s^* = \underset{t_s}{\arg\max}\, U_s^{SP}(t_s, p).$$

Here, $t_s^*$ is the $t_s$ that maximizes the utility for the SP 120. The result of application of the utility function for the service s is an indication as to whether the service s is to be deployed using edge device resources available to InP 130 from the ERO 110 or using core network resources of InP 130. The result of application of the utility function for the service s also may include one or more of an indication of the quantity of edge device resources necessary or desired by the SP 120 for the service s, a length of time for which the service s is to remained deployed on the type of resources selected for the service s (namely, the edge device resources available to InP 130 or the core network resources of InP 130), or the like, as well as various combinations thereof. The SP 120, by applying the utility function for each of services supported by SP 120, is able to determine, for each of services supported by SP 120, whether that service of SP 120 is to be deployed using core network resources of InP 130 or using edge device resources available to InP 130 (and, optionally, related information as discussed above). It is noted that the foregoing utility function is merely one type of utility function which may be used by SP 120 to determine whether services of SP 120 are to be deployed using core network resources of InP 130 or using edge device resources available to InP 130 (e.g., the utility value associated with use of the edge device resources of the ERO 110 may be defined and calculated in other ways, the utility value associated with use of the core network resources of the InP 130 may be defined and calculated in other ways, or the like, as well as various combinations thereof). It will be appreciated that, although primarily presented with respect to use of a single utility function to determine whether a particular service of the SP 120 is to be deployed using core network resources of InP 130 or using edge device resources available to InP 130, in at least some embodiments multiple utility functions may be used to determine whether a particular service of the SP 120 is to be deployed using core network resources of InP 130 or using edge device resources available to InP 130 (e.g., different utility functions may be used the respective results may be processed to determine whether the particular service of the SP 120 is to be deployed using core network resources of InP 130 or using edge device resources available to InP 130). It will be appreciated that, although primarily presented with respect to use of a single utility function to determine whether services of the SP 120 are to be deployed using core network resources of InP 130 or using edge device resources available to InP 130, in at least some embodiments multiple utility functions may be used to determine whether the services of the SP 120 are to be deployed using core network resources of InP 130 or using edge device resources available to InP 130 (e.g., different utility functions may be used for different service types of services of SP 120, for different services of SP 120, or the like, as well as various combinations thereof).

The SP 120 provides, to the InP 130, service deployment information determined by the SP 120 based on the service price p offered by the InP 130. The service deployment information includes information indicative as to which services of SP 120 are to be deployed using edge device resources available to InP 130 (e.g., a service list of services of SP 120 that are to be deployed using edge device resources available to InP 130, a service list of services of SP 120 that are to be deployed using core network resources of InP 130, indications for each of the services of SP 120 as to whether the service of the SP 120 is to be deployed using edge device resources available to InP 130 or using core network resources of InP 130, or the like, as well as various combinations thereof). This is reflected in the interaction model 200 as the service list $L^p$ (an example of which is depicted as service list 202, which illustrates three services selected for deployment using edge device resources available to InP 130). The service deployment information also may include, for each of the services of the SP 120 indicated to the InP 130 (which, again, at least includes a service list of services of SP 120 that are to be deployed using edge device resources available to InP 130 and which also may include a service list of services of SP 120 that are to be deployed using core network resources of InP 130), service description information describing the service, respectively. The service description information for a service may include various types of information which may be used to describe a service in a way that enables the InP 130 to deploy the service (which may vary for different service types, different services, or the like) such as, for example, the type or types of resources needed for the service, the quantity or quantities of resources needed for the service, connectivity information indicative of the required connectivity between resources for the service, bandwidth information indicative of network bandwidth required for the service, or the like, as well as various combinations thereof. For example, for an application hosting service, the service description may include an amount of compute resources needed, an amount of memory resources needed, an amount of storage requires needed, and an amount of bandwidth needed. For example, for a city-wide surveillance service, the service description may include an indication of a number of video cameras to be used, geographic areas for which video surveillance is required, geographic areas for which video surveillance is desired but not required, and an amount of bandwidth needed. It will be appreciated that the service description may include various other types of information which may be used to describe a service or the manner in which a customer requires or desires that a service be deployed (e.g., indications of geographic locations approved or disapproved for resources that will be used to provide the service, indications device types approved or disapproved use in providing the service, or the like, as well as various combinations thereof). It will be appreciated that, although primarily presented with respect to an embodiment in which SP 120 provides service description information to InP 130, InP 130 also or alternatively may obtain service description information (for one or more of the services of the SP 120 indicated to the InP 130 by the SP 120) from one or more other sources of service description information (e.g., locally at the InP 130 where InP 130 already stores some service description information for services of SP 120, one or more other devices or systems of SP 120 which are depicted or described herein, or the like, as well as various combinations thereof). The service deployment information also may include, for each of the services of the SP 120 indicated to the InP 130 (which, again, at least includes a service list of services of SP 120 that are to be deployed using edge device resources available to InP 130 and which also may include a service list of services of SP 120 that are to be deployed using core network resources of InP 130), one or more of an indication of the type(s) of resource(s) preferred by the SP 120 for deployment of services of SP 120, a length of time for which the services of the SP 120 are to remain deployed in the manner indicated (i.e., using edge device resources available to InP 130 or using core network resources of InP 130), or the like, as well as various combinations thereof. The service deployment information may be provided to the InP 130 by the SPD 122. The service deployment information may be provided to the InP 130 by SP 120 on a per service basis, as a set of service description information for a set of services, or the like, as well as various combinations thereof. It is noted that the service deployment information provided from SP 120 to InP 130 may include various other types of information which may be used by InP 130 to deploy services of SP 120.

The InP 130, based on the edge device resource sharing information determined by the ERO 110 based on incentive q and based on the service deployment information determined by the SP 120 based on the service price p, determines deployment of services of SP 120 using edge device resources available to InP 130 (namely, using edge device resources of EDs 111 of ERO 110 that are being made available to InP 130 by the ERO 110 based on the incentive q offered to the ERO 110 by InP 130). As discussed hereinabove, the edge device resource sharing information determined by the ERO 110 at least includes information representative of a resource graph $G^q$ representing edge device resources of EDs 111 of ERO 110 offered for sharing by ERO 110 (and, optionally, additional information such as the time for which the edge device resources are to be offered for sharing) and the service deployment information determined by the SP 120 at least includes a service list $L^p$ indicative of the services of the SP 130 that are to be deployed using edge device resources available to InP 130 (and, optionally, additional information such service description information describing the services of the SP 130 that are to be deployed using edge device resources available to InP 130). The InP 130 may determine deployment of services of SP 120 using edge device resources available to InP 130 in a manner for increasing or maximizing the profit of the InP 130 in deploying those services of SP 120. The profit of the InP 130 in deploying those services of SP 120 may be a difference between the income realized by the InP 130 from the deployment of those services of the SP 120 and the deployment cost incurred by the InP 130 in deploying those service of the SP 120 using edge device resources available to InP 130. The set of services of SP 120 to be deployed by InP 130 using edge device resources available to InP 130 may be represented as service set S (with each of the individual services being referenced using s). The income that may be realized by the InP 130 from the deployment of the service set S of the SP 120 may be represented as:

$$\text{Income} = \sum_{s \in S} I_{\{s \in L^p\}} pr_s.$$

The deployment cost incurred by the InP 130 in deploying the service set S of the SP 120 may be represented as:

$$\text{Deployment Cost} = \sum_{i \in V} qc_i - m(L^p, G^q),$$

where $m(L^p, G^q)$ represents use of a matching algorithm for determining a deployment of the service set S of the SP 120 (denoted by $L^p$) using edge device resources available to InP 130 (denoted by $G^q$) as multiple potential deployments of the service set S of the SP 120 using edge device resources available to InP 130 may be possible. As such, the profit of the InP 130 in deploying the service set S of SP 120 using edge device resources available to InP 130 may be represented as:

$$\pi(p, q) = \sum_{s \in S} I_{\{s \in L^p\}} pr_s - \sum_{i \in V} qc_i - m(L^p, G^q).$$

Here, assuming that the income from the deployment of those service of the SP 120 is constant independent of the specific deployment of those service of the SP 120 using edge device resources available to InP 130, then minimizing the deployment cost associated with the deployment of those service of the SP 120 using the edge device resources available to InP 130 will maximize the profit of the InP 130 in deploying those services of SP 120. The InP 130 may be configured to use various types of matching algorithms $m(L^p, G^q)$ for determining deployment of the service set S of the SP 120 (denoted by $L^p$) using edge device resources available to InP 130 (denoted by $G^q$). The matching algorithms may vary in terms of the manner in which matching is performed (e.g., maximizing edge resource sharing between different services, minimizing edge resource sharing between different services, or the like), the manner in which the objective is measured (e.g., determining a minimum value, minimizing a maximum value, or the like), or the like, as well as various combinations thereof. An example of a matching algorithm that is configured to minimize the deployment cost associated with the deployment of those services of the SP 120 using the edge device resources of ERO 110 that are available to InP 130 is presented in the interaction model 200 (illustratively, $$m(L^p, G^q) = \min \sum_{(i,j) \in E} t_{i,j} \cdot p_{i,j} + \sum_{n \in N} t_n \cdot p_n).$$

Here, the matching algorithm is configured to evaluate a set of potential deployments of those services of the SP 120 using the edge device resources available to InP 130 and to identify one of those potential deployments of those services of the SP 120 using the edge device resources available to InP 130 that minimizes $m(L^p, G^q)$ which is used to determine the deployment cost incurred by the InP 130 in deploying those services of the SP 120. Here, the matching algorithm is based on evaluation of the set of edges (or links between EDs 111) in the resource graph 201 (illustratively, evaluation of the set of edges E, including edges (i,j), based on $$\sum_{(i,j) \in E} t_{i,j} \cdot p_{i,j})$$

and based on evaluation of the set of nodes (or EDs 111) in the resource graph 201 (illustratively, evaluation of the set of nodes N, including nodes n, based on $$\sum_{n \in N} t_n \cdot p_n).$$

It will be appreciated that various other types of matching algorithms (e.g., based on evaluation of the resource graph 201 in other ways, based on other objectives, or the like) may be used by InP 130 to identify a potential deployment of those services of SP 120 that minimizes $m(L^p, G^q)$. The deployment of the services in the service list 202 on the edge device resources of the resource graph 201 reflected in the interaction model 200 as the service deployment 203, which illustrates deployment of the three services selected for deployment using edge device resources available to InP 130. It will be appreciated that, although omitted for purposes of clarity, the InP 130, based on the edge device resource sharing information determined by the ERO 110 based on incentive q and based on the service deployment information determined by the SP 120 based on the service price p, also may determine deployment of services of SP 120 using core network resources of InP 130 (e.g., services of SP 130 not being deployed using edge device resources of EDs 111 of ERO 110 may be deployed by InP 130 using the core network 131 of InP 130).

It will be appreciated that, in the interaction model 200, the computer performance of various elements or devices in the deployment of services may be improved in various ways. For example, the computer performance of an ED 111 may be improved in various ways (e.g., evaluating incentives, responding to incentives, offering resources for sharing, configuring resources to support services, or the like, as well as various combinations thereof). For example, the computer performance of EROD 112 may be improved in various ways (e.g., evaluating incentives, responding to incentives, offering resources for sharing, controlling configuring resources to support services, or the like, as well as various combinations thereof). For example, the computer performance of SPD 122 may be improved in various ways (e.g., handling service requests from customers, responding to service requests from customers, evaluating offers of service prices, responding to offers of service prices, selecting resources to host services, or the like, as well as various combinations thereof). For example, the computer performance of IPD 133 may be improved in various ways (e.g., offering incentives, responding to offers to share resources, offering service prices, responding to indications of deployment of services, determining deployments of services, controlling deployments of services, or the like, as well as various combinations thereof). The computer performance of various other elements or other devices in the deployment of services may be improved in various other ways.

It will be appreciated that the interaction model 200 of FIG. 2 may be modified in various ways. In at least some embodiments, for example, the interaction model 200 may be modified such that the basis for InP 130 to incentivize the ERO 110 and the basis for the ERO 110 to determine whether to share edge device resources of the EDs 111 of the ERO 110 may be more complicated (e.g., using other types of incentives, using other utility models or functions for evaluating incentives, or the like, as well as various combinations thereof). In at least some embodiments, for example, the interaction model 200 may be modified such that the basis for InP 130 to provide service price information to the SP 120 and the basis for the SP 120 to determine where services are to be deployed may be more complicated (e.g., using other types of service price information, using other utility models or functions for evaluating service prices, or the like, as well as various combinations thereof). In at least some embodiments, for example, the interaction model 200 may be modified to support different interactions between the entities (e.g., where the SP 120 and InP 130 are the same company), to include other interactions with one or more other entities (e.g., interactions between end users and SP 120, or the like), or the like, as well as various combinations thereof. It is noted that the interaction model 200 of FIG. 2 may be modified in various other ways.

Figure 3:
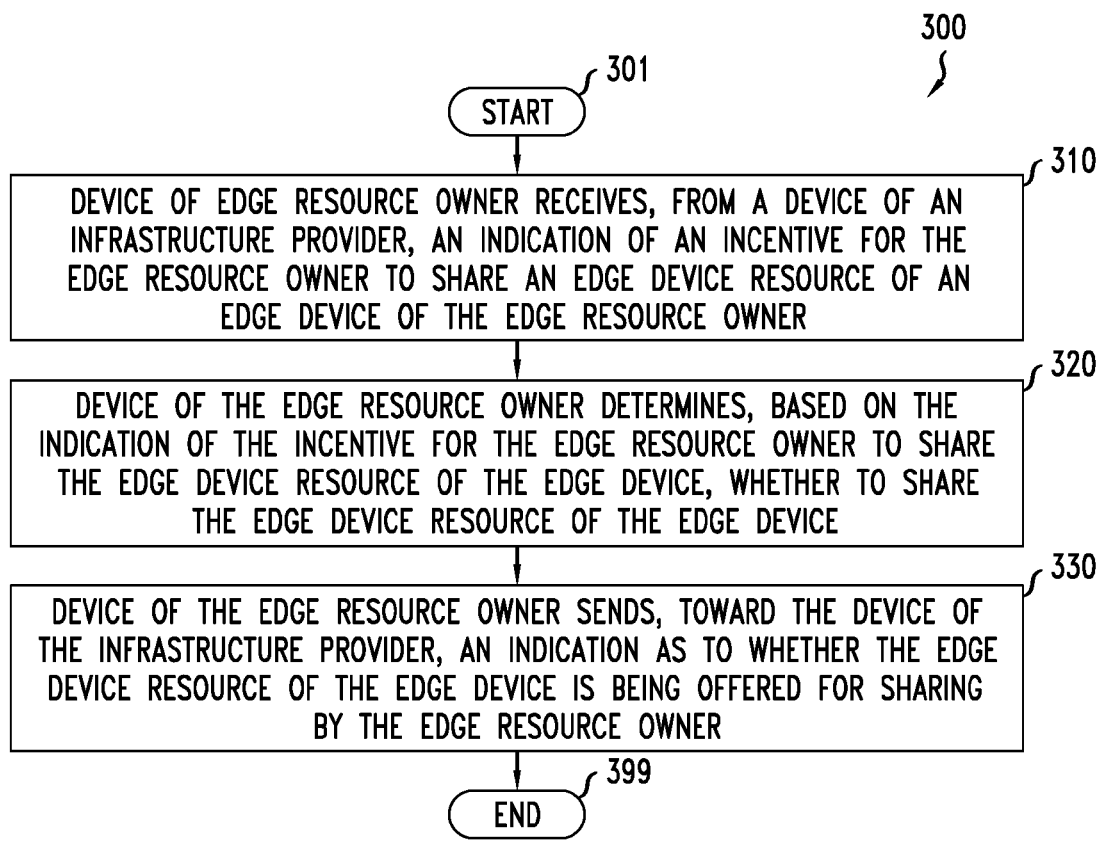
FIG. 3 depicts a method for use by a device of an edge resource owner to support use of edge resource sharing in providing services of a service provider to subscribers.

FIG. 3 depicts a method for use by a device of an edge resource owner to support use of edge resource sharing in providing services of a service provider to subscribers. It is noted that, although primarily presented in FIG. 3 as being performed serially, at least a portion of the functions of method 300 of FIG. 3 may be performed contemporaneously or in a different order than as presented in FIG. 3.

At block 301, method 300 begins.

At block 310, the device of the edge resource owner receives, from a device of an infrastructure provider, an indication of an incentive for the edge resource owner to share an edge device resource of an edge device of the edge resource owner.

At block 320, the device of the edge resource owner determines, based on the indication of the incentive for the edge resource owner to share the edge device resource of the edge device, whether to share the edge device resource of the edge device.

At block 330, the device of the edge resource owner sends, toward the device of the infrastructure provider, an indication as to whether the edge device resource of the edge device is being offered for sharing by the edge resource owner.

At block 399, method 300 ends.

It will be appreciated that, although primarily presented as ending, the device of the edge resource owner may perform various other functions within the context of method 300 or in association with execution of method 300 (e.g., receiving configuration information for deploying a service of a service provider on the edge device using the edge device resources offered for sharing by the edge resource owner, configuring the service of the service provider on the edge device using the edge device resources offered for sharing by the edge resource owner, or the like, as well as various combinations thereof).

Figure 4:
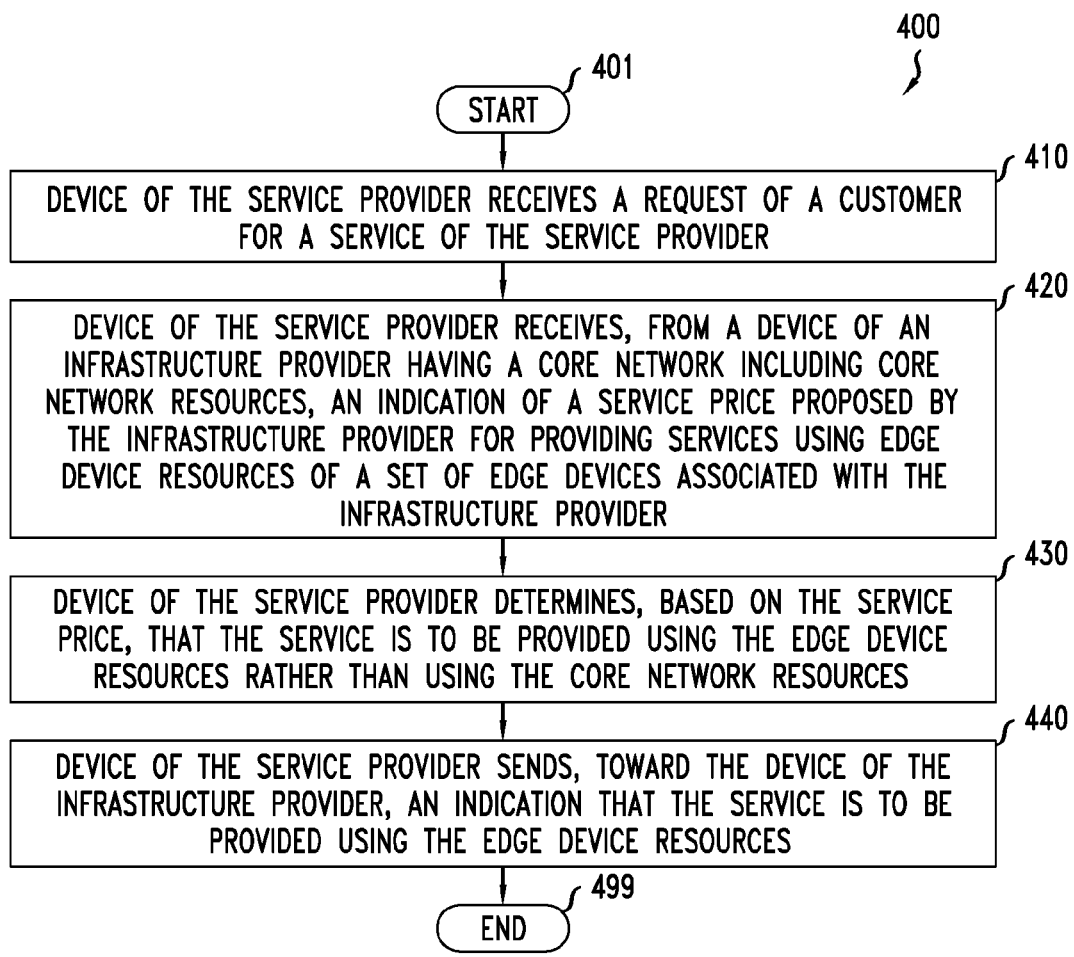
FIG. 4 depicts a method for use by a device of a service provider to support use of edge resource sharing in providing services of the service provider to subscribers.

FIG. 4 depicts a method for use by a device of a service provider to support use of edge resource sharing in providing services of the service provider to subscribers. It is noted that, although primarily presented in FIG. 4 as being performed serially, at least a portion of the functions of method 400 of FIG. 4 may be performed contemporaneously or in a different order than as presented in FIG. 4.

At block 401, method 400 begins.

At block 410, the device of the service provider receives a request of a customer for a service of the service provider.

At block 420, the device of the service provider receives, from a device of an infrastructure provider having a core network including core network resources, an indication of a service price proposed by the infrastructure provider for providing services using edge device resources of a set of edge devices of an edge resource owner.

At block 430, the device of the service provider determines, based on the service price, that the service is to be provided using the edge device resources rather than using the core network resources.

At block 440, the device of the service provider sends, toward the device of the infrastructure provider, an indication that the service is to be provided using the edge device resources.

At block 499, method 400 ends.

It will be appreciated that, although primarily presented as ending, the device of the service provider may perform various other functions within the context of method 400 or in association with execution of method 400 (e.g., receiving confirmation from the infrastructure provider that the service has been deployed using the edge device resources of the edge resource owner, providing the customer with an indication that the service has been deployed using the edge device resources of the edge resource owner and is now active for the customer, or the like, as well as various combinations thereof).

Figure 5:
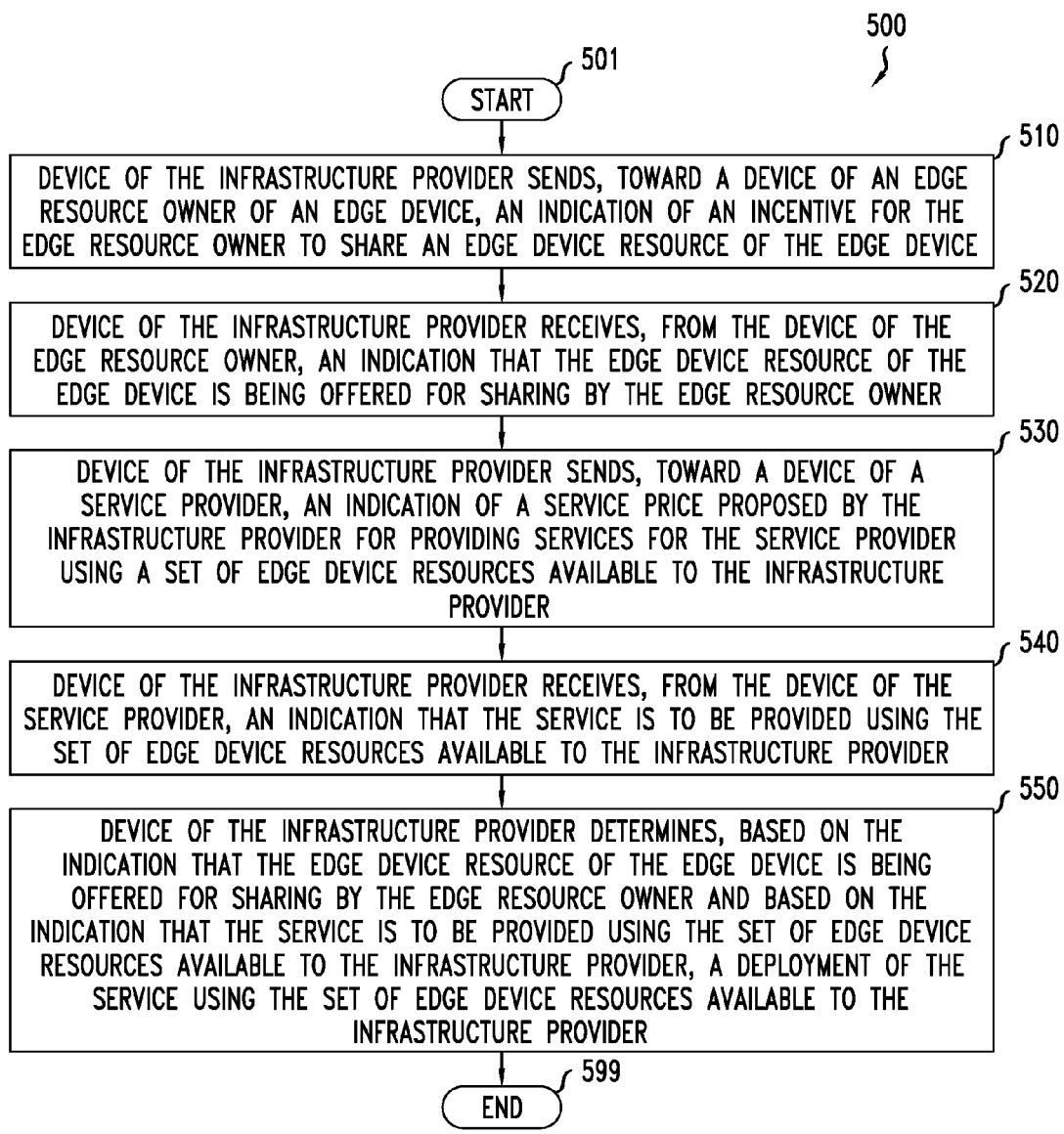
FIG. 5 depicts a method for use by a device of an infrastructure provider to support use of edge resource sharing in providing services of a service provider to subscribers.

FIG. 5 depicts a method for use by a device of an infrastructure provider to support use of edge resource sharing in providing services of a service provider to subscribers. It is noted that, although primarily presented in FIG. 5 as being performed serially, at least a portion of the functions of method 500 of FIG. 5 may be performed contemporaneously or in a different order than as presented in FIG. 5.

At block 501, method 500 begins.

At block 510, the device of the infrastructure provider sends, toward a device of an edge resource owner of an edge device, an indication of an incentive for the edge resource owner to share an edge device resource of the edge device.

At block 520, the device of the infrastructure provider receives, from the device of the edge resource owner, an indication that the edge device resource of the edge device is being offered for sharing by the edge resource owner.

At block 530, the device of the infrastructure provider sends, toward a device of a service provider, an indication of a service price proposed by the infrastructure provider for providing services for the service provider using a set of edge device resources available to the infrastructure provider. The set of edge device resources available to the infrastructure provider may include the edge device resource being offered for sharing by the edge resource owner.

At block 540, the device of the infrastructure provider receives, from the device of the service provider, an indication that the service is to be provided using the set of edge device resources available to the infrastructure provider.

At block 550, the device of the infrastructure provider determines, based on the indication that the edge device resource of the edge device is being offered for sharing by the edge resource owner and based on the indication that the service is to be provided using the set of edge device resources available to the infrastructure provider, a deployment of the service using the set of edge device resources available to the infrastructure provider. The deployment of the service using the set of edge device resources available to the infrastructure provider may include deployment of the service using the edge device resource being offered for sharing by the edge resource owner.

At block 599, method 500 ends.

It will be appreciated that, although primarily presented as ending, the device of the service provider may perform various other functions within the context of method 500 or in association with execution of method 500 (e.g., providing to the edge resource owner (e.g., the device of the edge resource owner, the edge device of the edge resource owner, or the like, as well as various combinations thereof) configuration information for deploying the service of the service provider using the edge device resources of the edge device of the edge resource owner, providing to the service provider an indication that the service has been deployed using the set of edge device resources available to the infrastructure provider (e.g., using the edge device resources of the edge device of the resource owner), or the like, as well as various combinations thereof).

The edge device of an edge resource owner may be configured to perform various functions. In at least some embodiments, an edge device of an edge resource owner may be configured to provide an indication of a set of edge device resources of the edge device which are being, or may be, offered for sharing by the edge resource owner and receive, from an infrastructure provider or a control device of the edge resource owner, configuration information adapted to configure the edge resource device to use at least a portion of the edge device resources to support a service of a customer of a service provider.

The customer device of a customer of a service provider may be configured to perform various functions. In at least some embodiments, the customer device of a customer of a service provider may be configured to send, to the service provider, a request for a service of the service provider and receive, from the service provider, an indication that the service requested by the customer has been deployed using edge device resources of one or more edge devices being shared by an edge resource owner of the edge device.

Figure 6:
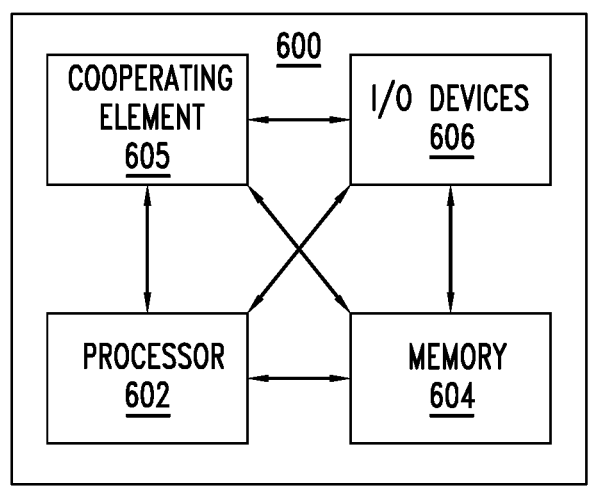
FIG. 6 depicts a high-level block diagram of a computer suitable for use in performing various functions presented herein.

FIG. 6 depicts a high-level block diagram of a computer suitable for use in performing various functions described herein.

The computer 600 includes a processor 602 (e.g., a central processing unit (CPU), a processor having a set of processor cores, a processor core of a processor, or the like) and a memory 604 (e.g., a random access memory (RAM), a read only memory (ROM), or the like). The processor 602 and the memory 604 are communicatively connected.

The computer 600 also may include a cooperating element 605. The cooperating element 605 may be a hardware device. The cooperating element 605 may be a process that can be loaded into the memory 604 and executed by the processor 602 to implement functions as discussed herein (in which case, for example, the cooperating element 605 (including associated data structures) can be stored on a non-transitory computer-readable storage medium, such as a storage device or other storage element (e.g., a magnetic drive, an optical drive, or the like)).

The computer 600 also may include one or more input/output devices 606. The input/output devices 606 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 600 of FIG. 6 may represent a general architecture and functionality suitable for implementing functional elements described herein, portions of functional elements described herein, or the like, as well as various combinations thereof. For example, computer 600 may provide a general architecture and functionality that is suitable for implementing one or more of an ED 111, an SPD 122, an IPD 133, or the like.

It will be appreciated that the functions depicted and described herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits (ASIC), and/or any other hardware equivalents).

It will be appreciated that at least some of the functions discussed herein as software methods may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus for improving computer performance in deployment of Internet-of-Things (IoT) services by service providers, the apparatus comprising:
   at least one processor; and
   at least one memory including computer program code;
   wherein the at least one memory and the computer program code are configured to, with the at least one processor, cause the apparatus to at least:
      send, by a device of an infrastructure provider toward a device of an edge resource owner of an edge device, an indication of an incentive for the edge resource owner to share an edge device resource of the edge device, wherein the edge device comprises an IoT device or a device supporting communications of an IoT device;
      receive, by the device of the infrastructure provider from the device of the edge resource owner, an indication that the edge device resource of the edge device is being offered for sharing by the edge resource owner;
      send, by the device of the infrastructure provider toward a device of a service provider, an indication of a service price proposed by the infrastructure provider for providing an IoT service for the service provider using a set of edge device resources available to the infrastructure provider;
      receive, by the device of the infrastructure provider from the device of the service provider, an indication that the IoT service is to be provided using the set of edge device resources available to the infrastructure provider; and
      determine, based on the indication that the edge device resource of the edge device is being offered for sharing by the edge resource owner and based on the indication that the IoT service is to be provided using the set of edge device resources available to the infrastructure provider, a deployment of the IoT service using the set of edge device resources available to the infrastructure provider.

2. The apparatus of claim 1, wherein the at least one memory and the computer program code are configured to, with the at least one processor, cause the apparatus to at least:
   determine, based on a prediction of responses of the service provider and the edge resource owner, the incentive for the edge resource owner to share the edge device resource of the edge device and the service price proposed by the infrastructure provider for providing the IoT service for the service provider using the edge device resource of the edge device of the edge resource owner.

3. The apparatus of claim 1, wherein the at least one memory and the computer program code are configured to, with the at least one processor, cause the apparatus to at least:
   determine, based on the indication that the edge device resource of the edge device is being offered for sharing by the edge resource owner, an edge resource graph indicative of shared edge resources available to the infrastructure provider for use in supporting IoT services.

4. The apparatus of claim 3, wherein the deployment of the IoT service is determined based on the edge resource graph.

5. The apparatus of claim 1, wherein, to determine the deployment of the IoT service, the at least one memory and the computer program code are configured to, with the at least one processor, cause the apparatus to at least:
   determine, for each of a plurality of potential deployments of the IoT service, a respective profit associated with the respective potential deployment of the IoT service; and
   determine the deployment of the IoT service by selecting one of the potential deployments of the IoT service based on the respective profits associated with the respective potential deployments of the IoT service.

6. The apparatus of claim 5, wherein, to determine the respective profit associated with the respective potential deployment of the IoT service, the at least one memory and the computer program code are configured to, with the at least one processor, cause the apparatus to at least:
   determine, based on the service price, an income associated with the respective potential deployment of the IoT service;
   determine, based on the incentive, a deployment cost associated with the respective potential deployment of the IoT service; and
   determine the respective profit associated with the respective potential deployment of the IoT service based on the income associated with the respective potential deployment of the IoT service and based on the deployment cost associated with the respective potential deployment of the IoT service.

7. The apparatus of claim 1, wherein, to determine the deployment of the IoT service, the at least one memory and the computer program code are configured to, with the at least one processor, cause the apparatus to at least:
   determine, from a plurality of potential deployments of the IoT service based on a matching algorithm, one of the potential deployments of the IoT service tending to minimize a deployment cost of deploying the IoT service.

8. The apparatus of claim 1, wherein the at least one memory and the computer program code are configured to, with the at least one processor, cause the apparatus to at least:
   send, toward at least one of the device of the edge resource owner or the edge device, a configuration message including configuration information adapted to configure the edge device to support the IoT service using the edge device resource of the edge device.

9. An apparatus for improving computer performance in deployment of Internet-of-Things (IoT) services by service providers, the apparatus comprising:
   at least one processor; and
   at least one memory including computer program code;
   wherein the at least one memory and the computer program code are configured to, with the at least one processor, cause the apparatus to at least:
      receive, by a device of an edge resource owner of an edge device from a device of an infrastructure provider, an indication of an incentive for the edge resource owner to share an edge device resource of the edge device, wherein the edge device comprises an IoT device or a device supporting communications of an IoT device;
      determine, by the device of the edge resource owner based on the indication of the incentive for the edge resource owner to share the edge device resource of the edge device, whether to share the edge device resource of the edge device;
      send, by the device of the edge resource owner toward the device of the infrastructure provider, an indication as to whether the edge device resource of the edge device is being offered for sharing by the edge resource owner; and receive, by the device of the edge resource owner from the device of the infrastructure provider, a message associated with configuration of the edge device to support deployment of the IoT service using the edge device resource of the edge device.

10. The apparatus of claim 9, wherein the device of the edge resource owner is the edge device.

11. The apparatus of claim 9, wherein the device of the edge resource owner is a control device of the edge resource owner.

12. The apparatus of claim 9, wherein whether to share the edge device resource of the edge device is determined based on a utility function configured to determine a first value indicative of a utility of sharing the edge device resource of the edge device and to determine a second value indicative of a utility of not sharing the edge device resource of the edge device.

13. The apparatus of claim 12, wherein the utility function comprises $$U_i^{ED}(t_i, q) = \begin{cases} qc_i - \theta_i c_i & \text{if } t_i = \text{'share'} \\ 0 & \text{if } t_i = \text{'not share'} \end{cases}.$$

14. The apparatus of claim 9, wherein whether to share the edge device resource of the edge device is determined based on a value indicative of a willingness of the edge resource owner to share the edge device resource of the edge device.

15. An apparatus for improving computer performance in deployment of Internet-of-Things (IoT) services by service providers, the apparatus comprising:
    at least one processor; and
    at least one memory including computer program code;
    wherein the at least one memory and the computer program code are configured to, with the at least one processor, cause the apparatus to at least:
        receive, by a device of a service provider, a request of a customer for an IoT service of the service provider;
        receive, by the device of the service provider from a device of an infrastructure provider having infrastructure provider resources, an indication of a service price proposed by the infrastructure provider for providing services using edge device resources of a set of edge devices of an edge resource owner, wherein the set of edge devices comprises at least one of an IoT device or a device supporting communications of an IoT device;
        determine, by the device of the service provider based on the service price, that the IoT service is to be provided using the edge device resources rather than using the infrastructure provider resources;
        send, from the device of the service provider toward the device of the infrastructure provider, an indication that the IoT service is to be provided using the edge device resources; and
        receive, by the device of the service provider from the device of the infrastructure provider, a message indicative of configuration of the set of edge devices to support deployment of the IoT service using the edge device resources of the set of edge devices.

16. The apparatus of claim 15, wherein the determination that the IoT service is to be provided using the edge device resources rather than using the infrastructure provider resources is based on a utility function configured to determine a first value indicative of a utility of providing the IoT service using the infrastructure provider resources and to determine a second value indicative of a utility of providing the IoT service using the edge device resources.

17. The apparatus of claim 15, wherein the utility function comprises $$U_s^{SP}(t_s, p) = \begin{cases} \gamma_s A r_s - p r_s & \text{if } t_s = \text{'edge resources'} \\ A r_s - p_0 r_s & \text{if } t_s = \text{'infrastructure provider resources'} \end{cases}.$$

18. The apparatus of claim 15, wherein the determination that the IoT service is to be provided using the edge device resources rather than using the infrastructure provider resources is based on at least one of a level of importance of the IoT service to the customer, a sensitivity of the service provider or the customer to a stability of the IoT service, or a quality-of-service associated with the IoT service.

19. The apparatus of claim 15, wherein the determination that the IoT service is to be provided using the edge device resources rather than using the infrastructure provider resources is based on an indication of a price associated with using the infrastructure provider resources to provide the IoT service.

* * * * *